United States Patent
Cushman et al.

[15] 3,639,012
[45] Feb. 1, 1972

[54] TREAD BELT AND ASSEMBLY

[72] Inventors: Walton W. Cushman, Fraser, Mich.; Martin Tucker, as trustee, New York, N.Y.

[22] Filed: Dec. 4, 1969

[21] Appl. No.: 881,975

[52] U.S. Cl. ............................. 305/35 EB, 305/11, 305/20
[51] Int. Cl. .......................................................... B62d 55/24
[58] Field of Search ........................... 305/35 EB, 37, 38, 56

[56] References Cited

UNITED STATES PATENTS

| | | | |
|---|---|---|---|
| 2,592,541 | 4/1952 | Curtis | 305/38 X |
| 2,652,290 | 9/1953 | Bekker | 305/38 X |
| 3,118,709 | 1/1964 | Case | 305/37 |
| 3,276,823 | 10/1966 | Tucker | 305/35 EB X |
| 3,451,728 | 6/1969 | Braneau | 305/35 EB X |

FOREIGN PATENTS OR APPLICATIONS

| | | | |
|---|---|---|---|
| 584,226 | 1/1947 | Great Britain | 305/38 |

*Primary Examiner*—Richard J. Johnson
*Attorney*—Lon H. Romanski

[57] ABSTRACT

An endless tread belt adapted to pass about two or more surface locomotion wheels is formed of an elastomeric material and has a plurality of spaced cleat portions extending generally transversely of the tread belt body; a generally medially situated constraining belt is contained generally within the belt body and positioned so as to have the medial portion thereof coextensive with the pitch diameter of the belt body, the constraining belt or strap is effective for assuring tracking means formed on the tread belt to be closely received within cooperating guide means formed in the surface locomotion wheels; the sides of the tread belt are provided with integrally formed passage-type locking means for receiving therein fingerlike locking members of side closure walls connectable to the tread belt at opposite sides thereof in order to form an enclosed chamber containing the locomotion wheels.

15 Claims, 11 Drawing Figures

INVENTOR.
Walton W. Cushman
BY
ATTORNEY

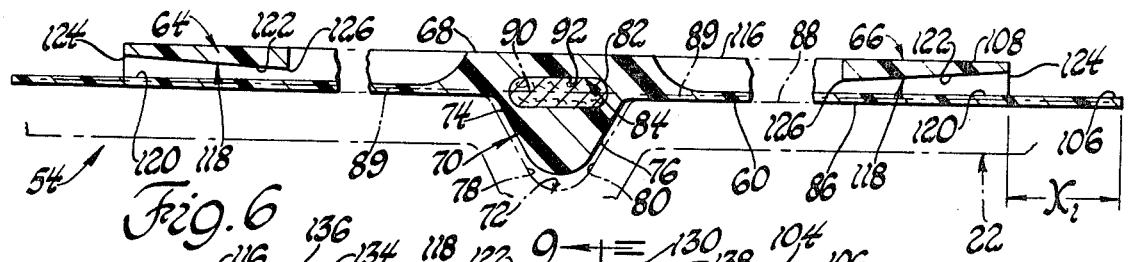
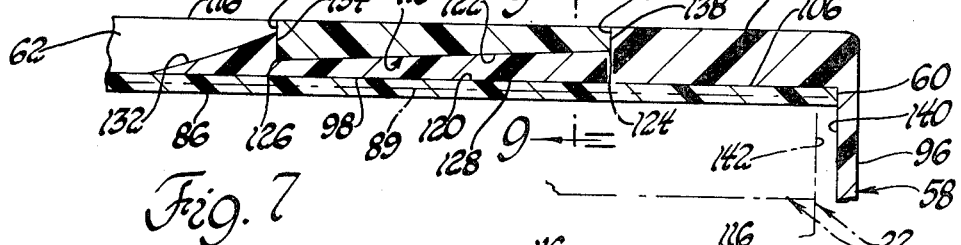
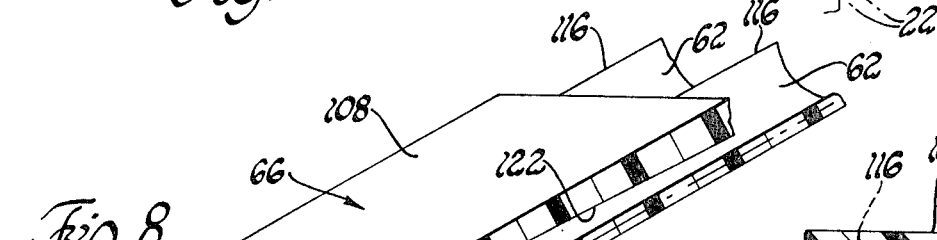
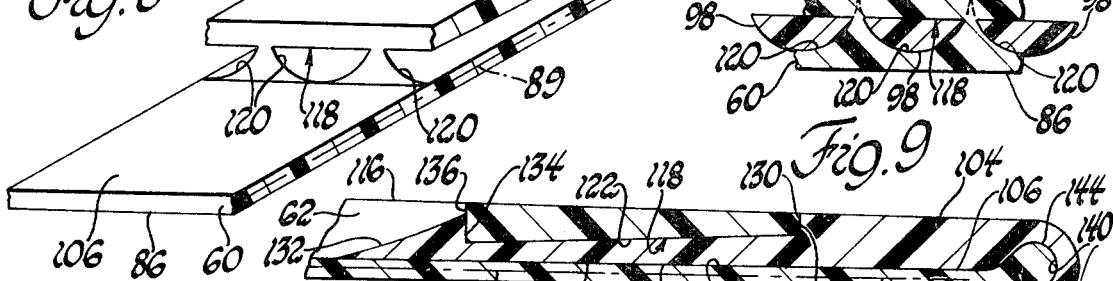
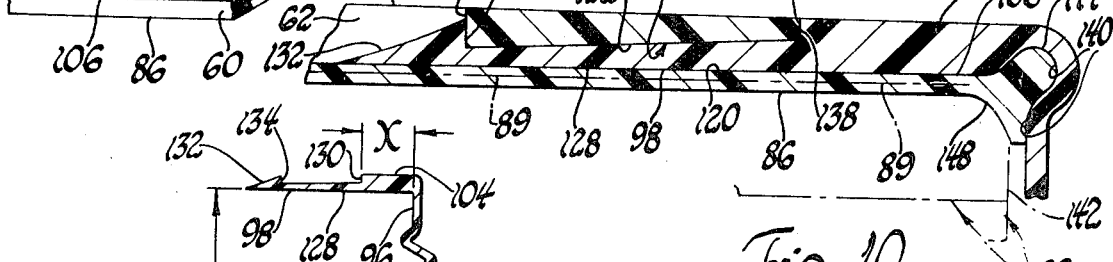
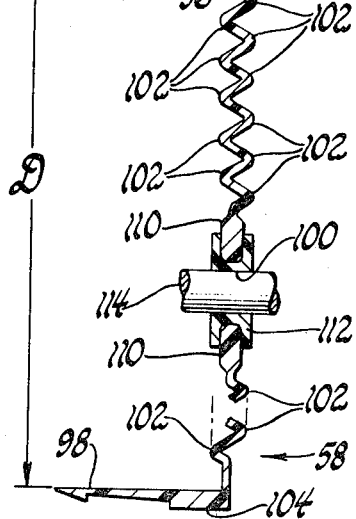

TREAD BELT AND ASSEMBLY

BACKGROUND OF THE INVENTION

Heretofore, various forms of tread belts have been proposed. However, such prior art tread belts have not always been satisfactory because of the undesirable effects that centrifugal forces create on the tread belt as such tread belt passes over and about cooperating surface locomotion wheels. This becomes especially important in situations where the belt body is relatively thin, and of elastomeric material, and required to undergo substantial surface velocities.

Additional problems have been encountered in those situations where a tread belt, as above, was to be provided with side or end closure walls connected to the tread belt as by a mechanical interlocking of related components formed by both the sidewalls and the tread belt. Because of such centrifugal forces, the interlocking elements were often caused to disengage thereby separating the sidewalls from the tread belt.

Accordingly, the invention as herein disclosed and described is concerned with the solution of the above as well as other related problems.

SUMMARY OF THE INVENTION

According to the invention, a tread belt comprises an endless tread belt body formed of an elastomeric material and having inner and outer surfaces, a plurality of spaced cleat means formed on and carried by said outer surface of said body, said constraining belt means being so situated as to have a midportion thereof substantially coextensive with the pitch line of said tread belt.

Various objects and advantages of the invention will become apparent when reference is made to the following detailed description considered in conjunction with the accompanying drawings.

DESCRIPTION OF THE DRAWINGS

In the drawings, wherein for purposes of clarity certain details may be eliminated from one or more views:

FIG. 6 is an enlarged transverse cross-sectional view of the tread belt taken generally on the plane of line 6—6 of FIG. 3 and looking in the direction of the arrows;

FIG. 7 is an enlarged fragmentary cross-sectional view taken generally on the plane of line 7—7 of FIG. 3 with the related side wall secured thereto;

FIG. 8 is an enlarged fragmentary perspective view of a locking portion formed on the tread belt;

FIG. 9 is a fragmentary cross-sectional view taken generally on the plane of line 9—9 of FIG. 7.

FIG. 10 is a view similar to FIG. 7 but illustrating a modified from of the invention; and FIG. 11 is an enlarged cross-sectional view taken generally on the plane of line 11—11 of FIG. 3 including, for illustrative purposes, a fragmentary portion of the related locomotion apparatus.

DESCRIPTION OF THE PREFERRED EMBODIMENTS

Figure 1:
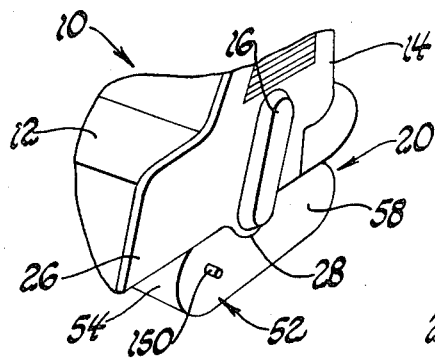
FIG. 1 is a vie illustrating, in perspective, a fragmentary portion of a vehicle provided with a tread belt in accordance with the teachings of the invention.

Referring now in greater detail to the drawings, FIG. 1 illustrates, in perspective, a fragmentary portion of a vehicle 10 having a seat portion 12 and an engine housing 14 with, for example, a removable cover 16 within which is generally situated suitable power conveying means such as a continuous belt or chain 18 (FIG. 2) which serves to convey driving power to a tracklike locomotion apparatus 20 situated at the rear of the vehicle 10.

Figure 2:
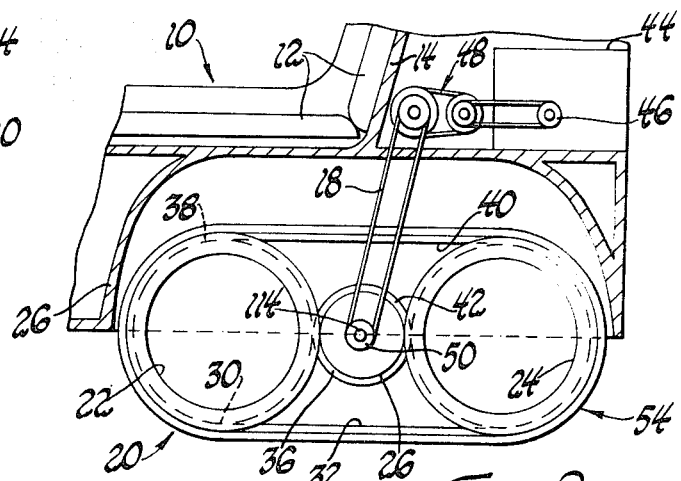
FIG. 2 is an enlarged side elevational view of the fragmentary portion of the vehicle of FIG. 1, including the associated locomotion apparatus, with certain portions thereof broken away and in cross section and certain other elements removed for purposes of clarity.

As generally illustrated in FIG. 2, the locomotion apparatus 20 may be comprised of spaced axially elongated wheels or rollers 22 and 24 between which is situated a main load hub or roller 26 having its opposite axial ends journaled within, for example, bearing portions carried by the vehicle body 26 as typically shown at 28. A system of continuous belts or chains may be employed for generally unifying the wheels 22 and 24 and roller 26 into an operational locomotion apparatus. For example, first load belt means 30 may be provided so as to generally circumferentially encompass a major peripheral portion of each of the wheels 22 and 24 and have its lower run portion 32 generally tangent to the lower portions of wheels 22 and 24 while the upper run portion 36 is looped as to pass under and in contact with the main or vehicle load roller 26. Additional snubbing or tensioning belt means 38 may be provided so as to similarly circumferentially encompass a major peripheral portion of each of the wheels 22 and 24 and have its upper run portion 40 generally tangent to the upper portions of wheels 22 and 24 while the lower run portion 42 thereof is looped as to pass over and in contact with the main or vehicle load roller 26. As shown, the various belt means may be situated within suitable grooves formed in and circumferentially about the wheels and hub.

An engine 44, having an output shaft 46, and a controllable power transmission assembly 48 are operatively connected to the main load roller 26 as by the belt or chain 18. Preferably, there would be such a power chain or belt disposed on each side of the vehicle 10 so as to be connected to cooperating sheaves or sprockets 50 mounted on the hub 26 externally beyond the axial ends of the cooperating wheels 22 and 24.

The locomotion apparatus 20 disclosed herein is merely by way of example since the precise configuration thereof forms no part of this invention except to the extent that it be one in which tread belt means can be employed thereabouts as generally indicated at 52 of FIGS. 1 and 2.

Figure 3:
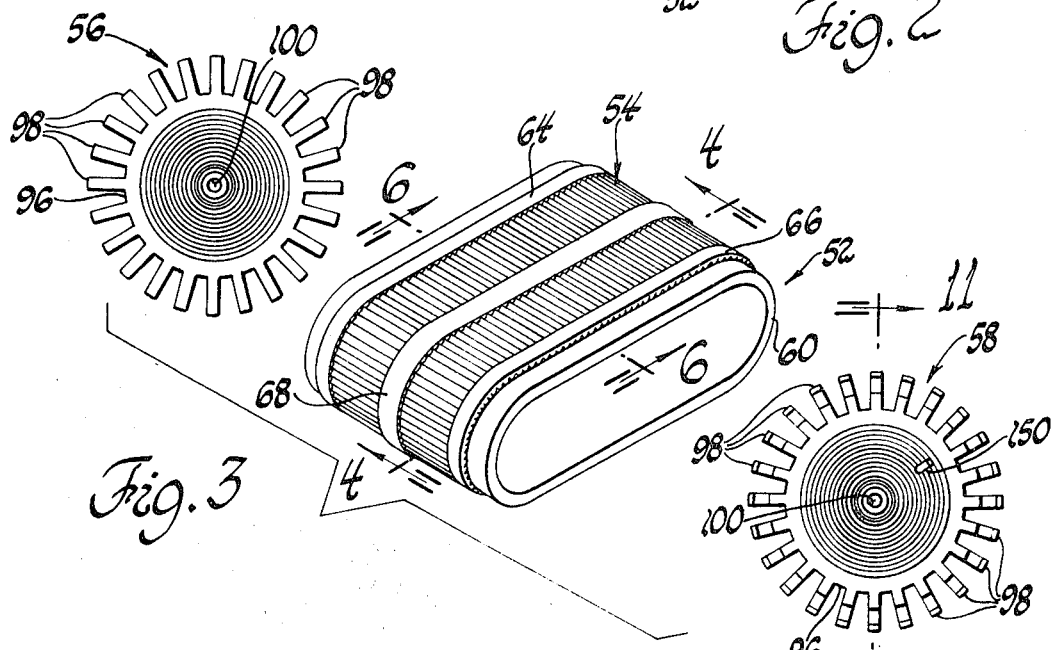
FIG. 3 is a somewhat simplified perspective view of the tread belt and sidewalls in generally exploded position.

FIG. 3, a generally exploded perspective view, illustrates the tread belt means 52 as being comprised of an endless elastomeric (preferably of polyurethane in the order of 60 Shore A) belt 54 which is adapted to be mounted about, for example, the wheels 22 and 24 for coaction with oppositely disposed end walls 56 and 58 which, when connected to the belt 54, serve to form a totally enclosed or sealed chamber containing the wheels 22, 24 and hub 26. Preferably, the end walls or sealing members 56 and 58 are formed of a relatively softer elastomeric material (in the order of, for example, 30–35 Shore A).

Figure 4:
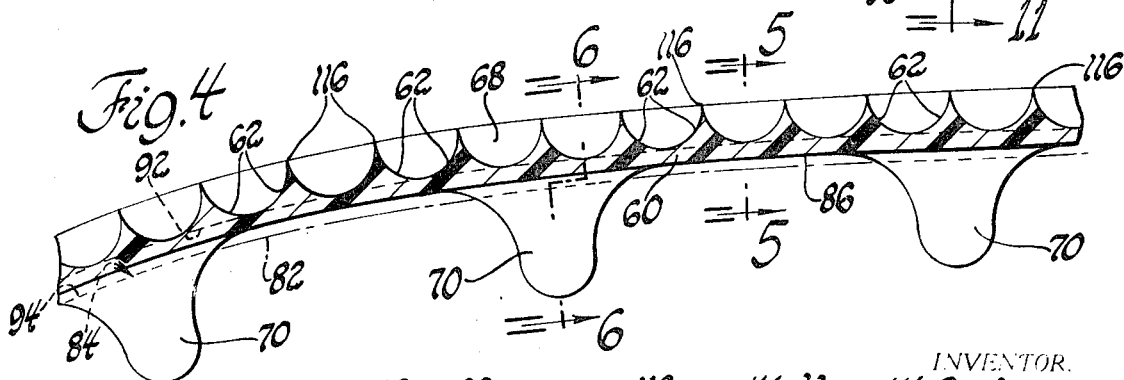
FIG. 4 is an enlarged fragmentary cross-sectional view taken generally on the plane of line 4—4 of FIG. 3 and looking in the direction of the arrows.

FIG. 4, an enlarged fragmentary cross-sectional view taken generally on the plane of line 4—4 of FIG. 3, illustrates the continuous or endless belt 54 as being comprised of a main body portion 60 with the outer surface thereof formed to provide a continuous band of cleats or cleatlike projections 62 extending generally transversely of the belt body 60 so as to be situated generally between continuous bands 64 and 66 of sidewalls locking means. Further, as is shown in each of FIGS. 3, 4, 5 and 6, a continuous bandlike body portion 68 is formed integrally with belt body 60 and cleat portions 62 so as to be disposed generally medially of the tread belt 54.

As is illustrated in FIGS. 4 and 6, a plurality medially disposed and spaced belt tracking lugs 70 are formed integrally with medial body portion 68 in a manner so as to be disposed inwardly thereof. The purpose of having successive lugs 70 spaced from each other is to provide sufficient room or space therebetween to accommodate the relative movement of such lugs 70 toward each other as the belt 54 contacts the wheels 22 and 24 and follows the curvature thereof. Such tracking or guide lugs 70 would be provided where the belt 54 were to be employed in combination with locomotion wheels having a continuous circumferential tracking groove as typically illustrated at 72 of FIG. 6. As shown, groove 72 is of a V-like cross-sectional configuration including sidewall surfaces 74 and 76 which are adapted to be confined by groove sidewalls 78 and 80 in order to preclude undesirable lateral movement of the guide lugs 70 and therefore the belt body 60.

FIG. 6 also typically illustrates another feature of the invention, that being, the provision of a holddown or constraining belt or wire 82 carried by the tread belt 54. As can be seen, body portion 68 is formed to provide an opening or chamber 84 through the belt body 60 and each of the integrally formed tracking lugs 70. When the tread belt body 60 is held against and passed about the locomotion wheels, as by having the inner surface 86 of belt body 60 against the outermost rolling diameter 88 of the wheels, such as wheel 22, a plane, depicted generally by line 89, exits within the belt body 60 which is neutral in that the plane or line 89 experiences neither compressive forces nor tension forces arising out of the belt body rollingly deflecting about the wheels. Such a plane or line 89, defined as the pitch line of the tread belt body, will be located generally midway between inner belt body surface 86 and outer belt body surface 106. Accordingly, chamber or opening 84 is so formed as to have the constraining strap 82 situated therein in a manner placing its midpoint or pitch line, as represented by line 90, to be substantially coplanar with the pitch line 89. By so doing, such compressive forces as may be developed in the lower or inner half of the strap 82, as the belt 54 passes about a cooperating locomotion wheel, are offset or counteracted by like and oppositely directed tension forces developed in the upper or outer half of the constraining strap 82. (The terms upper, and, lower, are employed with reference to the pitch line 90 passing through belt 82 as shown in FIG. 6.)

The purpose of the constraining strap 82 is to assure that the tracking or guide lugs 70 will be closely received within the cooperating guide grooves, such as 72, formed within the cooperating locomotion wheels.

Figure 5:
FIG. 5 is a fragmentary cross-sectional view taken generally on the plane of line 5—5 of FIG. 4 and looking in the direction of the arrows.

As is best shown in FIGS. 4 and 5, the upper surface 92 of the opening or passage 84 is formed as to be continuous, even as between succeeding lugs 70, while the lower surface 94 of the passage 84 extends only through the individual succeeding guide lugs 70. Therefore, the constraining or holding strap 82, shown in phantom line, has the lower portion thereof exposed in the span of the tread belt body 60 generally between such succeeding guide lugs 70.

The constraining strap 82 may, of course, be made from any of a great number of suitable materials, however, in the preferred form of the invention the strap 82 would be formed of woven nylon thereby imparting a high degree of flexibility to the strap 82 while still retaining the ability to withstand high tensile forces.

Each of the end walls or sealing members 56 and 58 are illustrated as being comprised of a relatively thin-walled circular body portion 96, having a diameter substantially equal to the diameter of the locomotion wheels 22 and 24, with a plurality of generally radiating finger portions or members 98 formed thereabout. In situations wherein the axis of the main drive hub 26 is to project through both sides of the locomotion apparatus 20, each of the walls or closures 56 and 58 would be provided with an aperture 100 formed through and centrally of the circular body portion 96.

In the preferred form, each of the side closure walls, as typically illustrated by side wall 58 in FIG. 11, would have their circular body 96 formed in a generally bellowslike configuration having a plurality of generally concentric convolutions 102 and of progressively increasing diameter from the center of the body 96.

Preferably, as best shown in FIG. 11, the sidewall body 96 is also provided with a continuous cuplike wall portion 104 formed as to be axially directed with respect to the general plane of body 96 and having an effective length indicated generally by the dimension, X, in FIG. 11. The length, X, as well as the relatively thickened cross section of portion 104 is provided in order to accommodate the distance, $X_1$, of FIG. 6 as well as the distance from the outer surface 106 of tread belt body 60 to the top surface 108 of beltlike portion 66. (The same, of course, applies to the other sidewall 56 and its application to the other side of the tread belt 54.) Additionally, the sidewalls would preferably be molded so as to have the finger portions 98 projecting generally inwardly (the term, inward, being employed with reference to the side of the closure wall at which the tread belt 54 would be connected).

Preferably, the control portion of the sidewalls would be of increased cross-sectional thickness, as shown at 110, through which would be formed the aperture 100. Such an aperture could then accommodate, therein, a suitable flanged backing or bearing member 112 which in turn would permit the passage therethrough of a shaft portion 114 of the main or vehicle load hub 26.

As shown in FIGS. 3, 6, 7, 8 and 9, the beltlike portions 64 and 66 are formed continuously about the tread belt 54 so as to have the upper surfaces 108 thereof at substantially the same height or level as the apexes 116 of the cleat portions 62. Further, in the preferred form, each of the beltlike portions 64 and 66 is provided with clearance passageways 118 formed therethrough so as to be generally transverse of the tread belt 54 and to be in alignment with the trough or spaces between successive cleats 62. As best shown in FIGS. 8 and 9, the lower surface 120 of each of the passageways 118 is of arcuate cross-sectional configuration which is effectively an extension or continuation of the arcuate space between succeeding cleats 62. However, as is shown in FIGS. 6, 7 and 10, the upper surface 122 of each of the passageways 118 is generally flat (when viewed as in FIG. 8) but tapered when viewed in longitudinal cross section so as to present an outer opening 124 somewhat larger than the inner opening 126.

As shown in FIGS. 7, 9, 10 and 11, the finger portions 98 are each comprised of a relatively elongated body portion 128 terminating at one end at a shoulder 130, formed on the cuplike annular portion 104, and terminating at the free end in an elongated lead portion 132 which is provided with an abutment portion or surface 134. As viewed in FIG. 9, it can be seen that each of the fingers 98 is preferably formed as to have a transverse cross-sectional configuration closely approximating the contour of the passage means 118.

When the side closures 56 and 58 are to be used, they may be assembled in the following manner. After the tread belt 54 is assembled onto the locomotion wheels 22 and 24, the sidewalls, such as 58, are brought up against the generally open axial end of the locomotion apparatus 20 and the bearing or sleeve 112 is slipped onto shaft 114 of the vehicle or main load hub 26. Next, each of the fingers 98 is inserted into and drawn through a cooperating passageway 118. Being of an elastomeric material, the main body portion 128 of the finger portions 98 may be somewhat stretched so as to have the lead end 132 pulled through the passageway 118 until the abutment portion 134 is free to abut against the inner abutment surface 136 thereby causing the outer abutment surface 138 of, for example, belt 66 to abuttingly engage the shoulder 130. Once all the finger members 98 are so drawn through cooperating passages 118, the sidewall is secured to the tread belt 54.

Preferably, the width of the tread belt 54 would be such as to extend some distance beyond the axial ends of the locomotion wheels 22 and 24. As typically illustrated in FIG. 7, this would result in the inner surface 140 of sidewall 58 being maintained some distance away from end 142 of the wheel 22 thereby preventing rubbing between such surfaces.

FIG. 10 illustrates a modification of both the tread belt 54 and the sidewall as 58. All elements which are like or similar to those of the preceding figures are identified with like reference numbers. As typically illustrated, each side of the tread belt 54 is formed with a continuous bead 144 which is adapted to be closely received within a cooperating continuous groove 146 formed in the body 96 of a sidewall, such as 58, generally at the corner formed by the cuplike wall portion 104. Further, preferably, the inner surface of the tread belt 54 is formed as to be somewhat curved inwardly as shown at 148, at the end thereof; the curved portion 148 being provided to cooperate with a like curved portion formed as on the locomotion wheel 22. As is evident, in view of FIG. 10, the curved portion 148 also serves to maintain an operational clearance between surfaces 140 and 142 of the sidewall body 96 and locomotion wheel 22.

As was previously stated, the effective diameter of the sidewalls, as generally represented by the dimension, D, of FIG. 11, is in its free state generally equal to the outer diameter the locomotion wheels 22 and 24 and therefore, when applied there would be no substantial stretching of the sidewalls when measured vertically through the axle 114 of FIG. 2. However, it should also be evident that such applied sidewall will be stretched a maximum distance when measured generally horizontally through the same axle 114 of FIG. 2.

Accordingly, it can be seen that when the tread belt 54 is employed in combination with the side closures and the locomotion wheels are rotated causing the tread belt to pass around such wheels, the sidewalls will continually undergo varying degrees of stretching to each side of a line drawn vertically through the hub shaft 114 as viewed in FIG. 2. However, such stretching is greatly accommodated by the convolutions 102 which permit multidirectional stretching or relative movement of the sidewall body 96.

It is, of course, conceivable that the tread belt 54 could be employed with or without the sidewalls 56 and 58 in combination therewith. Further, it should be apparent, in view of the preceding disclosure, that it would be possible to employ a tread belt such as 54 without the tracking means 70 when such tread belt was to be employed in combination with sidewall closures such as 56 and 58. In such instance, the cooperating sidewalls could provide the degree of tacking control necessary for assuring the proper tracking of the tread belt about the locomotion wheels.

Although the cleats 62 of the tread 54 could be of different cross-sectional configuration, the preferred configuration is that as shown. Various benefits are derived by use of such a preferred configuration. For example, by providing a greater number of grooves between such cleat portions a more uniform bending of the belt is achieved as it passes about the locomotion wheels. Further, in constructing the belt 54 with cleats as shown, a substantial savings in manufacturing costs can be achieved by the employment of commercially available "half-rounds"(elongated rods which have one cylindrical surface and a second flat surface corresponding to the diameter of such a cylinder) within the mold assembly for molding the tread belt.

In addition to the above, it should be apparent that the invention provides means for overcoming the effects of centrifugal force, on a totally enclosing tread belt assembly, which might otherwise result in the disengagement between the tread belt and sidewalls connected thereto. That is, regardless of the centrifugal force experienced, the bandlike portions 64 and 66 prevent the finger portions 98 being thrown outwardly and if there is any such tendency it would only have the effect of causing the lead portion 132 more tightly engage the abutment or locking surfaces 136.

Further, if desired, suitable inlet valve means 150 may be carried by one of the sidewalls, as 58 of FIG. 3, in order to enable the enclosed chamber defined by the tread belt assembly 52 to be at least partially pressurized as by the application of air under pressure through the inlet valve means 150.

Although only a select number of embodiments of the invention have been disclosed and described, it is apparent that other embodiments and modifications of the invention are possible within the scope of the appended claims.

I claim:

1. A tread belt, comprising an endless tread belt body formed of an elastomeric material and having first innner and outer surfaces, said tread belt being adapted to be so positioned with respect to associated locomotion wheels operationally carrying said tread belt as to have said first inner surface of said tread belt held against an outer cylindrical surface of said associated locomotion wheels, a plurality of cleat means formed on and carried by said first outer surface of said body, and relatively narrow constraining belt means carried by said tread belt body generally medially of the sides of said tread belt body and spaced a substantial distance inwardly from said sides, said constraining belt means having second inner and outer surfaces and being so situated as to have said second outer surface thereof within said tread belt body so as to be outwardly of said first inner surface of said tread belt body while said second inner surface is situated generally radially inwardly of said first inner surface of said tread belt body so as to thereby have a generally continuous midportion of said constraining belt means substantially coextensive with the pitch line of said tread belt body.

2. A tread belt, comprising an endless tread belt body formed of an elastomeric material and having inner and outer surfaces, a plurality of spaced cleat means formed on and carried by said outer surface of said body, relatively narrow constraining belt means carried by said tread belt body generally medially of the sides of said tread belt body and spaced a substantial distance inwardly from said sides, said constraining belt means being so situated as to have a continuous midportion thereof substantially coextensive with the pitch line of said tread belt, and belt-tracking means formed on and carried by said inner surface of said tread belt body, said constraining belt means being located generally between said tracking means and said outer surface, said constraining belt means thereby being effective to apply its full constraining effect for constraining movement of said tread belt body in order to thereby assure said belt tracking means to be confiningly received within guide means formed on associated locomotion wheels operationally carrying said tread belt body.

3. A tread belt, comprising an endless tread belt body formed of an elastomeric material and having inner and outer surfaces, a plurality of spaced cleat means formed on and carried by said outer surface of said body, and relatively narrow constraining belt means carried by said tread belt body generally medially of the sides of said tread belt body and spaced a substantial distance inwardly from said sides, said constraining belt means being so situated as to have a continuous midportion thereof substantially coextensive with the pitch line of said tread belt, said cleat means comprising a plurality of generally spaced outwardly directed narrow apexlike ridges extending generally transversely of said tread belt body, said ridges having spaces therebetween of a configuration generally semicylindrical cross section, said spaces being located from each other a distance as to cause adjoining ones of said semicylindrical cross sections generally to blend and meet each other at their widest most portions thereby defining said narrow apexlike ridges.

4. A tread belt, comprising an endless tread belt body formed of an elastomeric material and having inner and outer surfaces, a plurality of spaced cleat means formed on and carried by said outer surface of said body, constraining belt means carried by said tread belt body, said constraining belt means being so situated as to have a midportion thereof substantially coextensive with the pitch line of said tread belt, first and second continuous bandlike portions formed generally on and carried by said outer surface of said tread belt body, said first and second continuous bandlike portions being respectively formed at least near opposite sides of said tread belt body, passage means formed generally transversely of and through said continuous bandlike portions, first and second generally circular sidewall members for effectively closing the opposite sides of said tread belt body when said tread belt body is looped about associated surface locomotion wheels, each of said sidewall members comprising a plurality of generally radiating finger portions, each of said finger portions being adapted to be closely received through said passage means in order to thereby draw said sidewall members respectively into close assembled relationship to said opposite sides of said tread belt body, and looking means effective for mechanically locking said finger portions in said passage means.

5. A tread belt according to claim 4, wherein said first and second sidewall members are formed of an elastomeric material.

6. A tread belt according to claim 4, wherein each of said circular sidewall members comprises a generally circular main body portion, and convoluted expansion means formed integrally in said circular main body portion, said convoluted expansion means being effective to permit relative movement of sections of said circular main body portion so as to cause effective extension and contraction of said circular main body portion as said tread belt body moves in a generally looped condition about said associated surface locomotion wheels.

7. A tread belt according to claim 4, wherein each of said circular sidewall members comprises a generally circular main body portion formed of an elastomeric material, and expansion means formed integrally in said circular main body portion, said expansion means comprising a plurality of generally concentric annular convolutions of increasing diameter with respect to the center of said circular main body portion.

8. A tread belt according to claim 4, wherein each of said circular sidewall members comprises a generally circular main body portion formed of an elastomeric material, and wherein each of said circular main body portions is in its free state of a diameter closely approximating the rolling diameter of said associated surface wheels.

9. A tread belt according to claim 4, wherein said plurality of radiating finger portions are of elastomeric material formed integrally in each of said sidewall members, and wherein said locking means comprises an abutment portion formed on an end of each of said finger portions and an abutment surface formed on each of said continuous bandlike portions, said abutment portions and said abutment surfaces being adapted to abuttingly engage each other in locking fashion as respective ones of said finger portions are drawn through cooperating ones of said passage means formed through said continuous bandlike portions.

10. A tread belt according to claim 4, wherein each of said circular sidewall members comprises a generally circular main body section and a continuous generally cuplike wall extension formed generally peripherally about said main body section integrally therewith, wherein said plurality of radiating finger portions are formed integrally with said cuplike wall extension, and wherein said cuplike wall extension is held on overlying relationship to said outer surface of said tread belt body when said finger portions are drawn through said passage means formed through said continuous bandlike portions.

11. A tread belt according to claim 4, wherein said cuplike wall extension is of a cross-sectional thickness greater than the cross-sectional thickness of said generally circular main body section, including a continuous first abutment surface formed on said cuplike wall extension in the vicinity of the juncture of said finger portions and said cuplike wall extension, a second abutment surface formed on the outer end of said bandlike portions, wherein said locking means comprises an abutment portion formed on an end of each of said finger portions and a third abutment surface formed on the inner end of said bandlike portions, said first and second abutment surfaces being adapted to abuttingly engage each other whenever respective ones of said finger portions are drawn through cooperating ones of said passage means formed through said continuous bandlike portions so as to have said abutment portion abuttingly engage said third abutment surface.

12. A tread belt according to claim 4, wherein said tread belt body is provided with an integrally formed continuous bead formed at each side of said tread belt body, and wherein each of said sidewall members is provided with an integrally formed circular groove, each of said beads being adapted for reception in respective ones of said grooves when said sidewalls are assembled to said tread belt.

13. A tread belt, comprising an endless tread belt body formed of an elastomeric material and having inner and outer surfaces, a plurality of spaced cleat means formed on and carried by said outer surface of said body, constraining belt means carried by said tread belt body, said constraining belt means being so situated as to have a midportion thereof substantially coextensive with the pitch line of said tread belt, first and second continuous bandlike portions formed generally on and carried by said outer surface of said tread belt body, said first and second continuous bandlike portions being respectively formed at least near opposite sides of said tread belt body, said cleat means comprising a plurality of generally spaced outwardly directed ridges extending generally transversely of said tread belt body between said first and second continuous bandlike portions, passage means formed generally transversely of and through said continuous bandlike portions, first and second generally circular sidewall members for effectively closing the opposite sides of said tread belt body when said tread belt body is looped about associated surface locomotion wheels, each of said sidewall members comprising a plurality of generally radiating finger portions, each of said finger portions being adapted to be closely received through said passage means in order to thereby draw said sidewall members respectively into close assembled relationship to said opposite sides of said tread belt body, and locking means effective for mechanically locking said finger portions in said passage means.

14. A tread belt according to claim 13, wherein at least one of said circular sidewall members is provided with an aperture formed therethrough generally centrally thereof, said aperture being effective for receiving therethrough a member of the locomotion apparatus generally confined by said tread belt and sidewall members.

15. A tread belt, comprising an endless tread belt body formed of an elastomeric material and having inner and outer surfaces, a plurality of spaced cleat means formed on and carried by said outer surface of said body, relatively narrow constraining belt means carried by said tread belt body generally medially of the sides of said tread belt body and spaced a substantial distance inwardly from said sides, said constraining belt means being so situated as to have a continuous midportion thereof substantially coextensive with the pitch line of said tread belt, and tread belt tracking means formed on and carried by said inner surface of said tread belt body, said tracking means comprising a plurality of inwardly extending tracking portions spaced from each other longitudinally of said tread belt body, said constraining belt means comprising an outermost longitudinal extending surface and an innermost longitudinally extending surface, said constraining belt means being received through passage means formed in said tread belt body in a manner as to have said outermost longitudinal extending surface continuously juxtaposed to said tread belt body while said innermost longitudinally extending surface is totally exposed between said spaced tracking portions.

* * * * *